July 16, 1974  C. C. LIANG  3,824,130
CATHODE MATERIAL FOR SOLID STATE BATTERIES
Filed Nov. 2, 1972
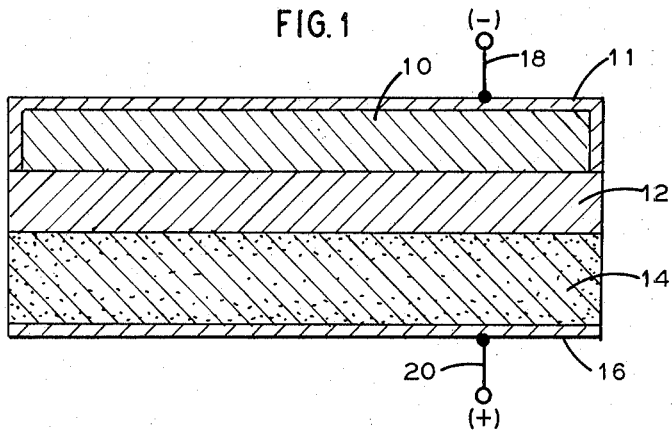
FIG. 1
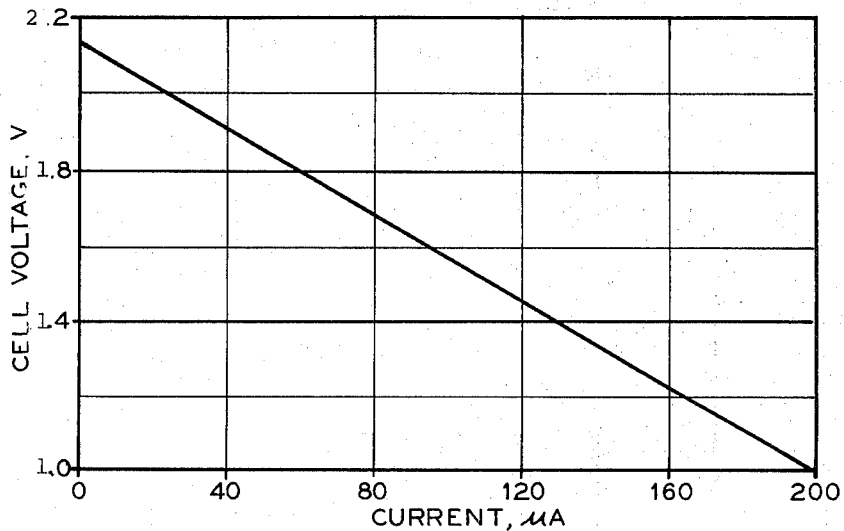
FIG. 3 (EXAMPLE 3)
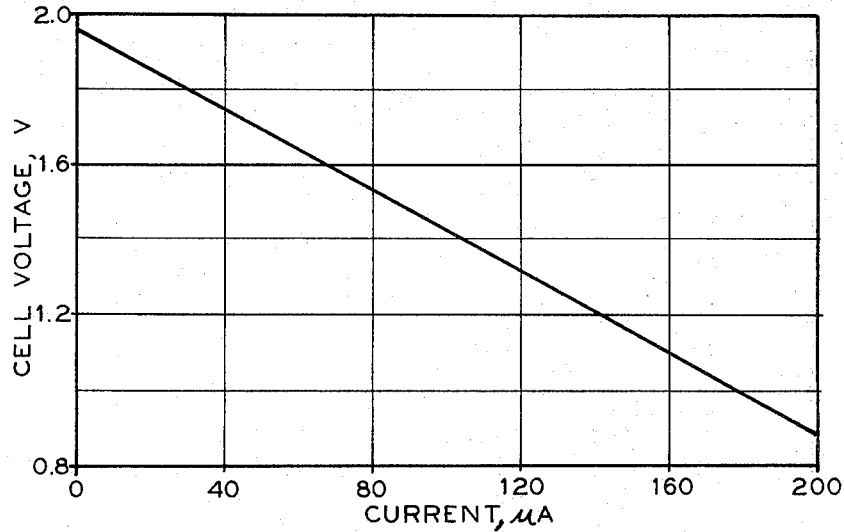
FIG. 2 (EXAMPLE 1)

United States Patent Office 3,824,130
Patented July 16, 1974

3,824,130
CATHODE MATERIAL FOR SOLID STATE BATTERIES
Charles Chi Liang, Andover, Mass., assignor to P. R. Mallory & Co., Inc., Indianapolis, Ind.
Filed Nov. 2, 1972, Ser. No. 303,181
Int. Cl. H01m 11/00
U.S. Cl. 136—83 R                                15 Claims

ABSTRACT OF THE DISCLOSURE

High energy density solid electrolyte cells are provided employing light metal anodes and metal sulfate cathodes. These cells employ lithium anodes, and the cathodes comprise a metal sulfate selected from the group consisting of the sulfates of lead, tin, copper, mercury, silver, calcium, and lithium. The preferred electrolyte comprises a composition containing lithium iodide, lithium hydroxide and aluminum oxide, although the alkali metal halides are also suitable for such use.

FIELD OF THE INVENTION

This invention relates to electric current-producing cells, and more particularly to solid electrolyte cells of high energy density.

BACKGROUND OF THE INVENTION

Miniaturization to electronics has been rapidly advancing in recent years and has resulted in increased demand for special power sources, characterized by volume and weight comparable to those of the electronic components employed in the circuitry. Some degree of success in meeting this demand has been achieved by employing solid electrolyte cells. Apart from the advantage of miniaturization, solid electrolyte cells in batteries assembled therefrom, permit great flexibility in design, and moreover possess extremely long shelf life, on the order of five to ten years.

The electrolytes employed in solid state cells are ionic conductors and, when incorporated between suitable anodes and cathodes, the cells formed thereby deliver voltage and current. The performance of any given cell depends upon the specific resistance of the electrolyte, the nature of the conducting species, their transport number, the temperature of the cell, the electrodes, and the final product of the cell reactions.

It is an object of the present invention to improve solid electrolyte cells.

It is another object of the present invention to provide a solid electrolyte cell characterized by high energy density.

It is a further object of the present invention to provide novel and improved high energy solid electrolyte cells in batteries having an extremely long shelf life, a large and continuous output of electrical energy for their size, and which may be readily manufactured and sold on a practical and commercial scale at a low cost.

Other and further objects and advantages of the present invention, will become apparent from the following description taken in conjunction with the accompanying drawings in which:

FIG. 1 is a schematic vertical section view of a solid electrolyte cell embodying the principles of the present invention.

FIG. 2 is a curve illustrating the polarization characteristics of a cell shown in FIG. 1.

FIG. 3 is a similar curve illustrating the polarization characteristics of another cell as shown n FIG. 1, but having a different electrode couple.

THE INVENTION

Broadly stated, in accordance with the principles of the present invention, there is provided a solid electrolyte cell comprising an active metal anode and a cathode constituted from metal sulfates, said anode and cathode being in intimate contact with an active solid electrolyte material. The high energy density of the system is realized by employing an active metal light weight high voltage anode, preferably an alkali metal such as lithium, although, under certain conditions, other active metals such as sodium and potassium may also be utilized.

The light weight high voltage active metal anode set forth above may be used directly in metallic form or its surface may be amalgamated with mercury. Moreover, the cell electrolyte material may be incorporated within the anode structure to increase the surface area thereof.

The cathodes selected for the cells of the present invention comprise any of the metal sulfates. In particular, lead sulfate, tin sulfate, copper sulfate, mercury sulfate, silver sulfate, and calcium sulfate may be used.

The preferred electrolyte for the above anode-cathode couples comprises a composition containing lithium iodide, lithium hydroxide, and aluminum oxide. However, alkali halides such as LiI, in combination with a doping agent to improve its conductivity may also be used. Preferred doping agents include magnesium and calcium iodide.

The major problem in solid electrolyte cells is the selection of suitable electrolytes. The ion or ions of the electrolytes should involve the ionic transport of the major part of the current. These and other requirements are satisfied by the system of the present invention.

$$\text{Li}/4\text{LiI}\cdot\text{LiOH}\cdot 2\text{Al}_2\text{O}_3/\text{M}_x(\text{SO}_4)_y/\text{M}'$$

where M is the metallic ion of the sulfate and M' is a metal which may or may not correspond to M.

Practical cells of this kind have been assembled by employing pressed pellets of the electrolyte salts, appropriately sandwiched between compressed pellets of the lithium anode and the sulfate cathode. A cell of the described character is illustrated in FIG. 1.

Referring now more particularly to FIG. 1 of the drawing, reference numeral 10 denotes the anode, which in the preferred embodiment of this invention may be lithium metal. Anode 10 is in contact with one face of a solid electrolyte layer 12 the other face of which is in contact with cathode 14. The cathode may be composed of a mixture of the metal sulfate, electronic conductors such as the metal component of the metal sulfate, and the electrolyte. Binders conventionally used in this art may also be incorporated therein. In place of the metallic particles of the metal of the sulfate, finely powdered graphite may also be utilized. The metallic particles or the graphite serve for improving the electronic conductivity of the cathode. The powdered solid electrolyte distributed thru the cathode also provides increased surface and increased ionic conductivity for the cathode.

The anode, which may be in the form of lithium powder, lithium foil, or lithium powder admixed with the cell solid electrolyte material, is compacted within an anode current collector cup 11. This is provided with lead wire 18. A contact layer 16 of high electrical conductivity, such as of silver foil, is applied to cathode 14 as a current collector. Lead wire 20 is connected to said cathode current collector contact layer 16. Lead wires 18 and 20 constitute the electrical terminals of the cell. For protection, the cells are hermetically sealed in a metal can utilizing suitable seals and insulators.

FIG. 2 indicates the open circuit and operating characteristics of the cell according to Example 1 assembled as described for FIG. 1, above, and in the text of said example. The open circuit voltage is 1.95±0.05 volts at room temperature. The potential varies linearly with the current drawn, indicating the internal resistance dominates the cell performance.

FIG. 3 indicates the open circuit and operating characteristics of the cell according to Example 3 which has an open circuit voltage of 2.2±0.1 volts at room temperature. This cell is based upon the lithium/silver sulfate couple, utilizing an electrolyte comprising LiI, LiOH, and $Al_2O_3$. The construction of the cell providing these characteristics is similar to that of Example 1.

The performance of all the above-mentioned cells may be improved by reducing the thickness of the electrolyte layer, by adding a doping salt to enhance ionic conductivity, by operating the cells at elevated temperatures or by a combination of these expedients. A plurality of the cells of this invention may be connected in series or in parallel or both, to obtain batteries of higher voltage, current delivery capability, and capacity.

In the preferred form of the invention described in connection with the figures and in the following examples, a lithium/$4LiI \cdot LiOH \cdot 2Al_2O_3$ half cell is combined with a $4LiI \cdot LiOH \cdot 2A_2O_3$/lead sulfate half cell. If, however, a LiI electrolyte is used instead, in order to prevent polarization behavior in such cells from being limited by the internal resistance of the electrolyte, it is preferred to improve the conductivity of the electrolyte by adding suitable doping salts.

It has been found that these metal sulfate cathodes are non-corrosive and that an entire cell, constructed utilizing such cathodes, can easily be enclosed within stainless steel casings utilizing suitable insulators for commercial production purposes. The use of such sulfate cathodes, therefore, greatly simplifies the manufacture and assembly of such single cells.

Although the present invention has been disclosed in connection with the preferred embodiments thereof variations and modifications may be resorted to by those skilled in the art without departing from the present invention. The following examples similarly illustrate the construction and utility of the present invention. It should however not be limited thereto.

EXAMPLE 1

Li/$4LiI \cdot LiOH \cdot 2Al_2O_3$/$PbSO_4$ solid electrolyte cell (A) Anode: Li metal, 1.47 cm.$^2$
(B) Electrolyte: $4LiI \cdot LiOH \cdot 2Al_2O_3$ electrolyte, 1.8 cm.$^2$, 0.2 mm. thick
(C) Cathode: A mixture of $PbSO_4$, Pb and $$4LiI \cdot LiOH \cdot 2Al_2O_3$$

or a mixture of PbSO, graphite and $4LiI \cdot LiOH \cdot 2Al_2O_3$.
(D) Anode current collector: 1 mil thick steel disc 1.8 cm.$^2$
(E) Cathode current collector: 1 mil thick Pb disc, 1.8 cm.$^2$ The test cell (FIG. 1) was made according to the following procedure: The electrolyte layer was formed in a steel die under a pressure of about 10,000 p.s.i. The cathode powder was spread on the electrolyte layer and the cathode current collector was placed on the cathode. This assembly was pressed under a pressure of 50,000–100,000 p.s.i. On the other side of the electrolyte layer, a lithium disc was placed inside the anode retaining ring and the anode current collector was placed on the lithium. This assembly was finally pressed under 35,000–50,000 p.s.i.

The test cell exhibited an open circuit voltage of 1.95±0.05 v. at room temperature and a polarization curve as shown by FIG. 2.

EXAMPLE 2

The Li/$4LiI \cdot LiOH \cdot 2Al_2O_3$/$CuSO_4$ cell (cathode: a mixture of Cu, $CuSO_4$ and electrolyte) exhibited an open circuit voltage of 2.05±0.05 v.

EXAMPLE 3

The Li/$4LiI \cdot LiOH \cdot 2Al_2O_3$/$Ag_2SO_4$ cell (cathode: a mixture of Ag, $Ag_2SO_4$ and electrolyte) exhibited an open circuit voltage of 2.20±0.1 v. at room temperature and a polarization curve as shown in FIG. 3.

All of these variations and modifications are considered to be within the true spirit and scope of the invention, as disclosed in the foregoing description and defined by the appended claims.

What is claimed is:
1. A solid state cell, operable at room temperature, comprising an active alkali metal anode; a cathode comprising a metal sulfate and an electronically conductive material, said metal sulfate selected from the group consisting of the sulfates of lead, tin, copper, mercury, silver, calcium and lithium; and a solid electrolyte therebetween, said solid electrolyte comprises a composition selected from the group consisting of LiI and mixture of LiI, LiOH, and $Al_2O_3$.
2. The cell according to claim 1 wherein said electronically conductive cathode material is selected from the group consisting of graphite, the metallic particles of the metals from the sulfate salts, and metals having oxidation potentials above said sulfate in the electrolyte and inert to said electrolyte.
3. The cell according to claim 1 wherein said alkali metal is lithium.
4. The cell according to claim 3 wherein said solid electrolyte material comprises a composition consisting of essentially LiI, $Al_2O_3$, and LiOH.
5. The cell according to claim 3 wherein said cathode is lead sulfate.
6. The cell according to claim 3 wherein said cathode is copper sulfate.
7. The cell according to claim 3 wherein said cathode is tin sulfate.
8. The cell according to claim 3 wherein said cathode is mercury sulfate.
9. The cell according to claim 3 wherein said cathode is silver sulfate.
10. The cell according to claim 3 wherein said cathode is lithium sulfate.
11. The cell according to claim 3 wherein said cathode is calcium sulfate.
12. The cell according to claim 1 wherein said electrolyte is LiI doped by the addition of conductivity-improving solid salts selected from the group consisting Mg and Ca iodide.
13. The cell according to claim 1 wherein said anode is lithium, said cathode comprises lead sulfate, and said electrolyte comprises a composition consisting of essentially LiI, LiOH, and $Al_2O_3$, and has an open circuit voltage of about 2.2 volts.
14. The cell according to claim 1 wherein said anode is amalgamated with mercury.
15. The cell according to claim 1 wherein said anode additionally comprises said solid electrolyte material.

References Cited

UNITED STATES PATENTS

| | | | |
|---|---|---|---|
| 3,361,596 | 1/1968 | Senderoff et al. | 136—137 |
| 3,730,775 | 5/1973 | Liang | 136—83 R |
| 3,701,686 | 10/1972 | Argue et al. | 136—153 X |
| 3,463,670 | 8/1969 | Rao et al. | 136—83 R |
| 3,506,492 | 4/1970 | Buzzelli et al. | 136—153 X |
| 3,713,897 | 1/1973 | Liang | 136—153 |

ANTHONY SKAPARS, Primary Examiner

U.S. Cl. X.R.

136—137, 153